UNITED STATES PATENT OFFICE.

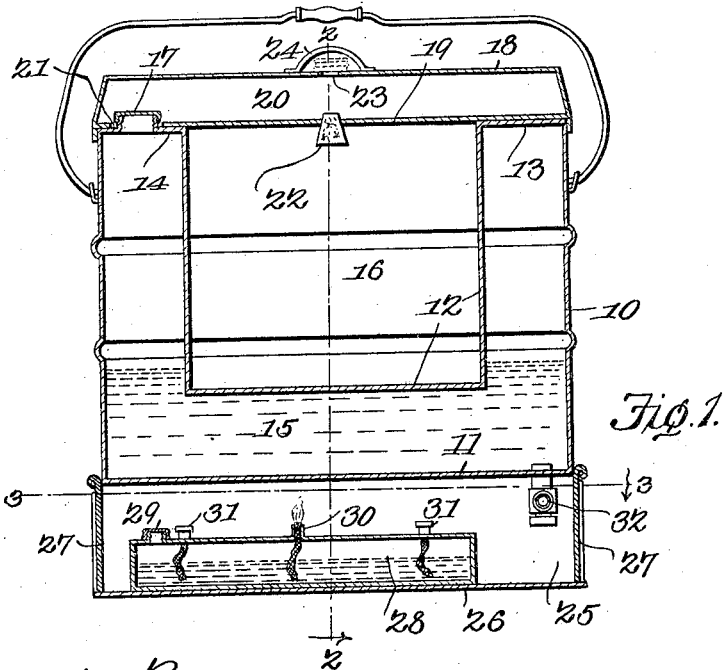

GEORGE L. GERLACH, OF HARRISON, NEBRASKA.

DINNER-PAIL.

No. 821,795.  Specification of Letters Patent.  Patented May 29, 1906.

Application filed October 12, 1905. Serial No. 282,483.

*To all whom it may concern:*

Be it known that I, GEORGE L. GERLACH, a citizen of the United States, residing at Harrison, in the county of Sioux and State of Nebraska, have invented a new and useful Dinner-Pail, of which the following is a specification.

This invention relates to dinner-pails, and has for an object to provide a pail embodying new and improved features of convenience, efficiency, and economy.

A further object of the invention is to provide a pail embodying means whereby the heated vapor from the heated liquid may be conducted away from the pail or directed into the victual-receptacle to heat and steam the contained food.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of the advantages of this invention.

In the drawings, Figure 1 is a longitudinal sectional view of the improved dinner-pail. Fig. 2 is a transverse sectional view taken on line 2 2 of Fig. 1. Fig. 3 is a horizontal sectional view taken on lines 3 3 of Figs. 1 and 2.

Like characters of reference indicate corresponding parts in all of the figures of the drawings.

In its preferred embodiment the improved dinner-pail forming the subject-matter of this application comprises a substantially rectangular shell 10, having a bottom 11, and within which is secured a U-shaped sheet 12, having the outturned flanges 13 and 14 at its upper end secured to the upper transverse edges of the shell and extending entirely across divides the shell into a liquid-reservoir 15 and an open-topped victual-receptacle 16.

The liquid-reservoir 15 is provided with a charging-opening through the flange 14, closed by a screw-cap 17, and a cover 18 is disposed over and to cover the pail and having a diaphragm 19, forming a double cover defining the chamber 20. The diaphragm 19 is provided with an aperture 21, proportioned and disposed to accommodate the screw-cap and disposed to accommodate the screw-cap or its screw-threaded collar, so that the upper end of the cap or collar is disposed within the chamber 20. The diaphragm is also provided with an opening centrally located above the victual-receptacle and closed in any approved manner, as by the stopper 22, and an opening 23 is provided centrally through the top plate of the cover and above which preferably arches the the loop 24.

Beneath the shell 10 and bottom 11 is disposed a heating compartment comprising the side walls 25 and bottom 26, having normally open ends closed by the perforate slides 27. Within the heating compartment is disposed any approved heating element, preferably the flat rectangular lamp-body 28, having any approved form of charging-aperture, as the screw-cap 29, and provided with any approved number of tubular burners 30, each having a cap, as 31, so that any desired number from one to all may be simultaneously used.

Within the heating-compartment is placed the faucet 32, proportioned to extend beyond the lines of the pail when open and to be closed by folding entirely within the heating-compartment.

The liquid-reservoir and victual-receptacle will be filled and carried in the usual well-known manner, and when the liquid is to be warmed or heated the burners are lighted and the screw-cap 17 removed, when any steam or vapor generated will pass into the chamber 20 and out through the opening 23. If it is desired to heat and steam the contents of the victual-receptacle, the stopper 22 is removed and the screw-cap 17 placed over the opening 23 under the loop 24, thus deflecting the heated vapor downwardly through the central opening into the receptacle, while the cap loosely covering the opening 23 serves as a safety-valve.

When a liquid is to be drawn from the reservoir, the faucet 32 may be swung into the position shown by dotted lines in Fig. 3 to open it.

Having thus described the invention, what is claimed is—

1. A dinner-pail comprising, a liquid-reservoir provided with a closable opening, a victual-receptacle disposed within the reservoir, a heating element positioned to heat the liquid, and a cover for the pail provided with means to conduct heated vapor from the reservoir to the receptacle.

2. A dinner-pail comprising, a liquid-reservoir, a closure for the reservoir, a victual-receptacle disposed within the reservoir, a hollow cover proportioned to cover the receptacle and reservoir, a heating element positioned to heat the reservoir and means whereby the heated vapor from the reservoir may escape through the hollow cover or selectively directed into the victual-receptacle.

3. A dinner-pail comprising, a liquid-reservoir, a victual-receptacle, a heating element positioned to heat the liquid, a double cover provided with an opening communicating with the reservoir and with an opening communicating with the receptacle also an opening communicating with the exterior.

In testimony that I claim the foregoing as my own I have hereto affixed my signature in the presence of two witnesses.

GEORGE L. GERLACH.

Witnesses:
   ALEX. LOWRY,
   CONRAD PARSONS.